United States Patent
Chieu et al.

(10) Patent No.: US 10,560,347 B2
(45) Date of Patent: Feb. 11, 2020

(54) COMPLIANCE VALIDATION FOR SERVICES BASED ON USER SELECTION

(71) Applicant: International Business Machines Corporation, Armonk, NY (US)

(72) Inventors: Trieu C. Chieu, Brooklyn, NY (US); Ashu Gupta, Hyderabad (IN); Manas R. K. Singh, Chappaqua, NY (US); Xiao Yi Tian, Beijing (CN)

(73) Assignee: International Business Machines Corporation, Armonk, NY (US)

(*) Notice: Subject to any disclaimer, the term of this patent is extended or adjusted under 35 U.S.C. 154(b) by 344 days.

(21) Appl. No.: 14/797,502

(22) Filed: Jul. 13, 2015

(65) Prior Publication Data

US 2017/0019314 A1   Jan. 19, 2017

(51) Int. Cl.
*H04L 12/24* (2006.01)

(52) U.S. Cl.
CPC ................ *H04L 41/5054* (2013.01)

(58) Field of Classification Search
CPC .................................... H04L 64/1433
USPC ........................................... 709/226
See application file for complete search history.

(56) References Cited

U.S. PATENT DOCUMENTS

| | | |
|---|---|---|
| 8,504,880 B2 | 8/2013 | Li et al. |
| 8,566,449 B2 | 10/2013 | Guest et al. |
| 8,943,178 B2 | 1/2015 | Bortnikov et al. |
| 2010/0071066 A1* | 3/2010 | Kline ............ G06F 8/60 726/25 |
| 2013/0247136 A1* | 9/2013 | Chieu ............ G06F 21/577 726/1 |
| 2013/0254254 A1* | 9/2013 | Livshits ......... G06Q 10/10 709/201 |
| 2014/0280961 A1* | 9/2014 | Martinez ........ H04L 41/5054 709/226 |

* cited by examiner

*Primary Examiner* — Sm A Rahman
*Assistant Examiner* — Emad Siddiqi
(74) *Attorney, Agent, or Firm* — Daniel R. Simek

(57) ABSTRACT

Aspects of the present invention disclose a method, computer program product, and system for validation of services. The method includes one or more processors receiving a request of a service. The method further includes one or more processors parsing the received request of the service to identify information included in the received request of the service. The method further includes one or more processors generating a checklist that corresponds to the received request of the service based on the identified information, wherein the generated checklist includes configuration and security checks that are associated with the received request of the service. The method further includes one or more processors determining a validation result utilizing the generated checklist, wherein the validation result indicates whether the requested service is deployed on a corresponding endpoint according to the configuration and security checks in the generated checklist.

17 Claims, 8 Drawing Sheets

```
"providers":[
    {
      "type" : "<managed service Provider Types>",
      "name" : "<managed service Provider Name>",
      "actionType" : "<action Type>"
      "url" : "<managed service Provider API URL>",
      "username" : "<Username>",
      "password" : "<Password>",
      "enabled" : true,
      "param" : {
          "<param_specific_property1>" : <param property1 value>,
"<param_specific_property2>" : <param property2 value>,
...
"<param_specific_propertyN>" : <param propertyN value>,
      }
    }]
```

FIG. 5

COMPLIANCE VALIDATION FOR SERVICES BASED ON USER SELECTION

BACKGROUND OF THE INVENTION

The present invention relates generally to the field of service management, and more particularly to validating configuration and compliance of services.

Information technology (IT) service management (ITSM) is a process which aligns IT services (e.g., manages services) to businesses and can provide a focus on the delivery of best services to an end user. For example, ITSM can be utilized in a cloud infrastructure to provide various enterprise IT services to a customer or other types of end users. ITSM includes activities and services that are performed by an organization or part of an organization to plan, deliver, operate, and control IT services offered to customers. The activities and services are directed by policies and are organized and structured in processes and supporting procedures. For example, some managed services are governed by policies that manage validation of configuration and security compliance for the managed services. Security compliance is utilized to ensure that security risks, governance controls, and vulnerabilities are actively managed throughout the lifecycle of the managed services. Validation processes can be carried out utilizing a checklist that covers various verifications that correspond to a managed service.

IT infrastructure library (ITIL) is a set of practices for ITSM that focuses on aligning IT services with the needs of businesses. ITIL describes processes, procedures, tasks, and checklists which are not organization-specific but can be applied by an organization for establishing integration with the organization's strategy, delivering value, and maintaining a minimum level of competency. ITIL allows the organization to establish a baseline from which it can plan, implement, and measure. It is used to demonstrate compliance and to measure improvement.

It is known to validate domain name services (DNS) or other configuration data for multiple network services provided by a common multi-tenant application server by U.S. Pat. No. 8,566,449 by Guest et al., which teaches that the validation system suitably receives configuration data from the multi-tenant application server for each of the services provided. The validation system also performs a validation query to a domain name services or other public service on the network to obtain public data about each service. The publicly-available information is compared to the data received from the multi-tenant application server, and any anomalies are reported and/or repaired as appropriate.

SUMMARY

Aspects of the present invention disclose a method, computer program product, and system for validation of services. The method includes one or more processors receiving a request of a service. The method further includes one or more processors parsing the received request of the service to identify information included in the received request of the service. The method further includes one or more processors generating a checklist that corresponds to the received request of the service based on the identified information, wherein the generated checklist includes configuration and security checks that are associated with the received request of the service. The method further includes one or more processors determining a validation result utilizing the generated checklist, wherein the validation result indicates whether the requested service is deployed on a corresponding endpoint according to the configuration and security checks in the generated checklist.

Another aspect of the present invention discloses the method for determining the validation result utilizing the generated checklist. The method includes one or more processors identifying one or more script functions that are associated with the requested service and the corresponding endpoint, wherein the script functions execute configuration and security checks associated with a checklist. The method further includes one or more processors executing the one or more identified script functions on the corresponding endpoint. The method further includes one or more processors determining a validation result based on results returned from the executed script functions.

Another aspect of the present invention discloses the method for determining the validation result utilizing the generated checklist. The method includes one or more processors identifying one or more validation plug-ins that are associated with the requested service. The method further includes one or more processors executing the one or more identified validation plug-ins. The method further includes one or more processors determining a validation result based on results returned from the executed validation plug-ins.

An additional aspect of the present invention discloses the method for generating a checklist that corresponds to the received request of the service based on the identified information. The method includes one or more processors identifying one or more checklist questions stored in a database that are associated with the identified information included in the received request of the service. The method further includes one or more processors generating a checklist that includes the one or more identified checklist questions.

An additional aspect of the present invention discloses the method for receiving the request of the service. The method includes one or more processors receiving a selection of one or more services via one or more user interface portals, wherein each service is respectively associated with configuration parameters and security parameters.

In another aspect of the present invention the method further includes one or more processors storing results of the configuration and security checks included in the generated checklist.

Another aspect of the present invention discloses the method for determining the validation result utilizing the generated checklist. The method includes one or more processors identifying one or more script functions that are associated with the requested service and the corresponding endpoint, wherein the script functions execute configuration and security checks associated with a checklist. The method further includes one or more processors creating one or more script functions based on parameters of the corresponding endpoint and the one or more identified script functions. The method further includes one or more processors executing the one or more created script functions. The method further includes one or more processors determining a validation result based on results returned from the executed script functions.

BRIEF DESCRIPTION OF THE DRAWINGS

FIG. 5 depicts an example of a request of a managed service input by a customer, in accordance with an embodiment of the present invention.

DETAILED DESCRIPTION

Embodiments of the present invention allow for an automated method and system for validating configuration and compliance of services in a multi-tenant cloud computing environment. The method and system is capable of dynamically composing a checklist question set that can be validated based on an order request from a customer. The customer's order can be for different managed service providers, which include different configurations and security settings. Various embodiments of the present invention allow for validating the configuration and compliance of services in a multi-tenant cloud service environment.

Embodiments of the present invention recognize that validating configuration and security compliance is an important part of a service management process and for governance in information technology (IT) delivery organizations. Validating configuration and security compliance help ensure that security risks, governance controls, and vulnerabilities are pro-actively managed throughout the life cycle of services and that discovered problems and issues are addressed and remediated for quality assurance purposes. Validating configuration and security compliance can be particularly challenging in multi-tenant cloud managed services. Performing validation of configuration and security compliance can be challenging because customers can order a variety of different managed services, and each potential managed service can have different security and configuration settings. In addition, the customers can choose or customize policies for compliance and security/health checking. Further, procedures to gather, consolidate, and validate acceptable evidence for the managed services can differ for different managed services, which can lead to increased difficulty for users without domain expertise.

Implementation of embodiments of the invention may take a variety of forms, and exemplary implementation details are discussed subsequently with reference to the Figures.

Figure 1:
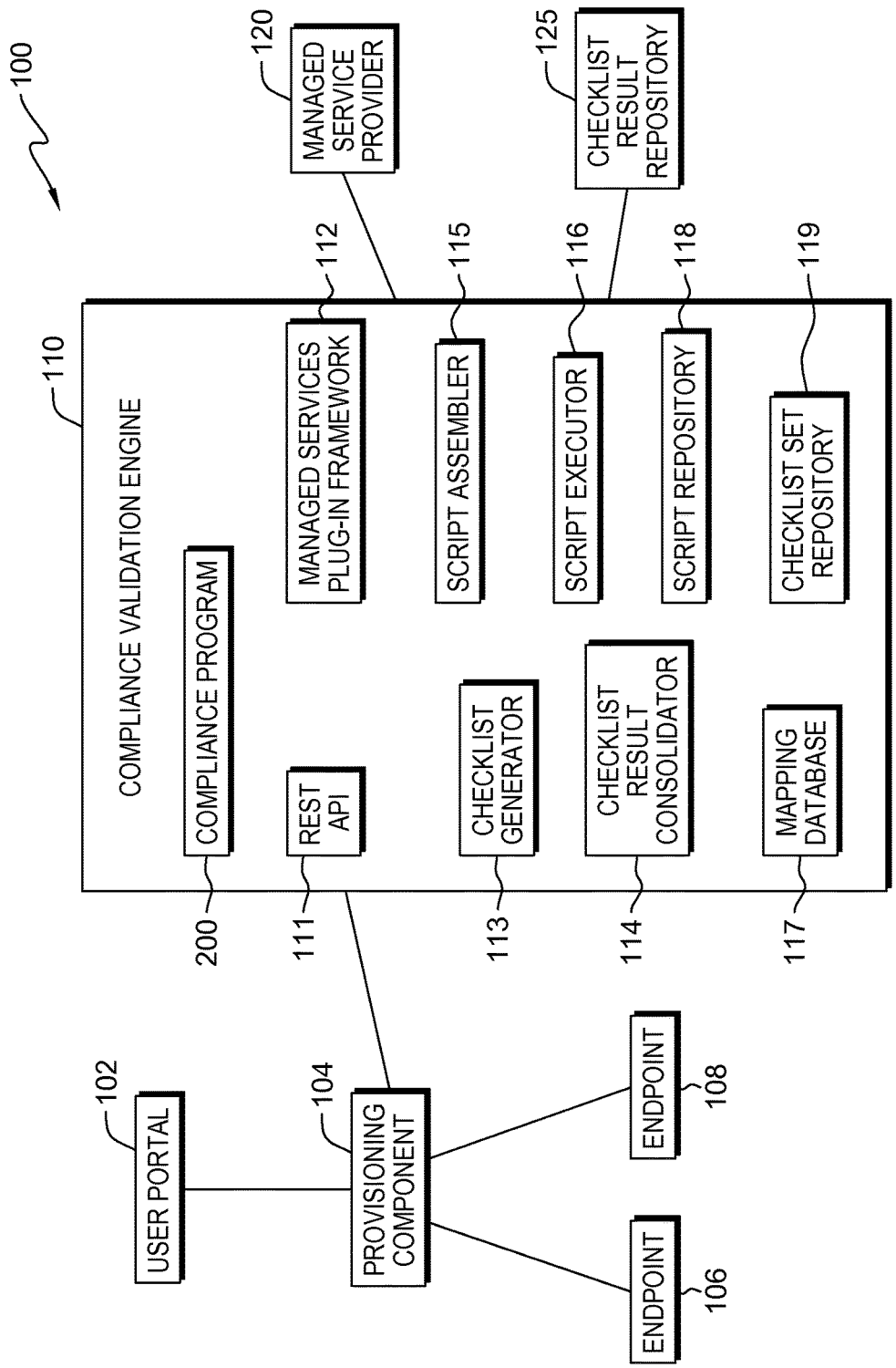
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes user portal 102, provisioning component 104, endpoints 106 and 108, compliance validation engine 110, managed service provider 120, and checklist result repository 125. In one embodiment, user portal 102, provisioning component 104, endpoints 106 and 108, compliance validation engine 110, managed service provider 120, and checklist result repository 125 communicate utilizing network communications. Network communications can be, for example, a local area network (LAN), a telecommunications network, a wide area network (WAN), such as the Internet, or any combination of the three, and include wired, wireless, or fiber optic connections. In general, network communications can be any combination of connections and protocols that will support communications between user portal 102, provisioning component 104, endpoints 106 and 108, compliance validation engine 110, managed service provider 120, and checklist result repository 125, in accordance with embodiments of the present invention. In an example embodiment, data processing environment 100 is representative of a multi-tenant cloud computing environment that provides managed services (e.g., from a plurality of managed service providers) to users (e.g., in response to a user request).

User portal 102 is a portal that users of a computing environment (e.g., a cloud computing environment) can utilize to interact with the computing environment. In an example embodiment, user portal 102 is a user interface or an application programming interface (API) that is accessible to customers of a cloud computing environment to request functionalities of the cloud environment. For example, a customer can utilize user portal 102 to request provisioning of a new virtual machine (VM), services on VMs, destroy a VM, etc. In additional embodiments, data processing environment 100 can include additional instances of user portals (not shown). Customers can utilize user portal 102 to select one or more managed services, each of the managed services having respective configurations and security settings, each with service configuration parameters and service security parameters In one embodiment, user portal 102 is a user interface that resides on a computing device that is accessible to customers of a cloud computing environment. A user interface is a program that provides an interface between a user of a computing device and a plurality of applications that reside on the computing device. A user interface refers to the information (such as graphic, text, and sound) that a program presents to a user, and the control sequences the user employs to control the program. A variety of types of user interfaces exist. In one embodiment, the user interface is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, the user interface is a script or application programming interface (API).

Provisioning component 104 is a component of a cloud computing environment that can fulfill customer requests (e.g., from user portal). In one embodiment, provisioning component 104 can provision services (e.g., VM operations, etc.) on a requested endpoint, such as endpoints 106 and 108. In example embodiments, provisioning component 104 can operate as an application that is hosted on a server computer or other computing device (e.g., the same computing device as user portal 102, on a server that hosts compliance validation engine 110, etc.). In another embodiment, provisioning component 104 routes a request of a managed service (e.g., entered by a customer into user portal 102) to compliance validation engine 110.

Endpoints 106 and 108 are requested deployment destinations for managed services. For example, a customer utilizes user portal 102 and requests a managed service to be executed or deployed on one or more of endpoints 106 and 108. In one embodiment, endpoints 106 and 108 are target VMs that can operate managed services of the cloud computing environment. In various embodiments, endpoints 106 and 108 are VMs that are hosted on one or more server computers. In example embodiments, endpoints 106 and 108 can be on a desktop computer, a computer server, or any other computer systems known in the art. In certain embodiments, endpoints 106 and 108 can operate on computer systems utilizing clustered computers and components (e.g., database server computers, application server computers, etc.) that act as a single pool of seamless resources when accessed by elements of data processing environment 100. A server may include components as depicted and described in further detail with respect to FIG. 6, in accordance with embodiments of the present invention.

Compliance validation engine 110 includes compliance program 200, Representational State Transfer (REST) API 111, managed services plug-in framework 112, checklist generator 113, checklist result consolidator 114, script assembler 115, script executor 116, mapping database 117, script repository 118, and checklist set repository 119. In various embodiments, compliance program 200 utilizes components and modules of compliance validation engine 110 (e.g., REST API 111, managed services plug-in framework 112, checklist generator 113, checklist result consolidator 114, script assembler 115, script executor 116, mapping database 117, script repository 118, and checklist set repository 119). Compliance program 200 validates the configuration and compliance of managed services that are deployed on a cloud computing environment, in accordance with embodiments of the present invention.

In example embodiments, compliance validation engine 110 can be a desktop computer, a computer server, or any other computer systems known in the art. In certain embodiments, compliance validation engine 110 represents computer systems utilizing clustered computers and components (e.g., database server computers, application server computers, etc.) that act as a single pool of seamless resources when accessed by elements of data processing environment 100 (e.g., provisioning component 104). In general, compliance validation engine 110 is representative of any electronic device or combination of electronic devices capable of executing computer readable program instructions. Compliance validation engine 110 may include components, as depicted and described in further detail with respect to FIG. 6, in accordance with embodiments of the present invention.

REST API 111 is an API (or another type of application) that can receive and process service requests. In an example embodiment, compliance validation engine 110 receives (e.g., from provisioning component 104 or user portal 102) a request for a managed service that was input into user portal 102 (e.g., by a customer). REST API 111 can receive a service request and validate information included in the request. In one embodiment, REST API 111 receives a service request and validates the format of the received request. In other embodiments, REST API 111 can be an API that is based on a plurality of different architectures (i.e., other than REST).

Managed services plug-in framework 112 is a component of compliance validation engine 110 that manages plug-ins of managed services. In various embodiments, the plug-ins of managed services include information on how to perform validations for the configuration of managed services on endpoints. In an example embodiment, managed services plug-in framework 112 determine relevant plug-ins, which have knowledge on how to communicate with managed service provider 120. Managed services plug-in framework 112 utilizes identified information that is associated with the received request to identify and utilize plug-ins that are associated with a received request of a managed service. In various embodiments, the plug-ins are software components and/or applications, which may be based on, or include, APIs. Managed services plug-in framework 112 can register and run plug-ins, which can communicate with a remote managed service provider (e.g., managed service provider 120).

Checklist generator 113 is a component of compliance validation engine 110 that generates a checklist that corresponds to a received request for a managed service. In one aspect, for each managed service type, checklist generator 113 identifies checklist questions (e.g., in checklist set repository 119) utilizing mapping database 117. In another aspect, for each enabled managed service provider, checklist generator 113 initializes a corresponding plug-in (e.g., utilizing managed services plug-in framework 112) with a corresponding configuration and checklist question set.

Checklist result consolidator 114 is a component of compliance validation engine 110 that utilizes the result sets from checklists to generate a report. In example embodiments, checklist result consolidator 114 determines reports, which are stored in checklist result repository 125. In various embodiments, once generated checklists and associated plug-ins validate deployment of a managed service on an endpoint (e.g., endpoints 106 and 108), checklist result consolidator 114 creates a report utilizing the resulting information, and the created report (e.g., also storing the associated information) is stored on checklist result repository 125.

Script assembler 115 is a component of compliance validation engine 110 that utilizes managed services plug-in framework 112 to identify and assemble validation scripts that correspond to a received request for a managed service. In one embodiment, script assembler 115 utilizes configuration information that is included in the received request as run-time parameters to identify and generate scripts. In another aspect, compliance program 200 utilizes plug-ins to parse the configuration information from the received request. In an example embodiment, script assembler 115 composes script functions with specified configuration parameters based on information from managed service providers.

Script executor 116 is a component of compliance validation engine 110 that is capable of executing scripts on an endpoint. For example, script executor 116 executes scripts assembled by script assembler 115 on one or more of endpoints 106 and 108. In example embodiments, script executor 116 transfers scripts to an endpoint, executes the scripts on the endpoint, and fetches the corresponding results of the scripts. For example, script executor 116 can utilize secure shell (SSH), secure copy (SCP), or another approach to transfer scripts to an endpoint.

Mapping database 117 is a repository or database on compliance validation engine 110 that includes information that indicates relationships between managed services, plug-ins, checklist questions, and scripts. For example, mapping database 117 includes data associations between information stored in script repository 118, managed service provider 120, managed services plug-in framework 112, and checklist set repository 119. In example embodiments, mapping database 117 stores associations between managed service types and checklist questions, managed service type/name and plug-ins, plug-ins and scripts, etc.

Script repository 118 is a repository or database on compliance validation engine 110 that stores scripts that can be utilized by script assembler 115 and script executor 116. In another embodiment, plug-ins can generate scripts based on information that is stored in script repository 118 and store scripts in script repository 118. Checklist set repository 119 is a repository or database on compliance validation engine 110 that stores checklist questions and corresponding answers/definitions, which are utilized by checklist generator 113. In an example embodiment, an individual associated with compliance validation engine 110 (e.g., a system administrator, a customer, etc.) and/or a set of procedures defines a set of compliance checklist question sets that address IT standards of compliance and regulations, which are stored in checklist set repository 119.

Mapping database 117, script repository 118, and checklist set repository 119 can be implemented with any type of storage device, for example, persistent storage, which is capable of storing data that may be accessed and utilized by compliance validation engine 110, such as a database server, a hard disk drive, or a flash memory. In other embodiments, mapping database 117, script repository 118, and checklist set repository 119 can represent multiple storage devices within compliance validation engine 110.

Managed service provider 120 is capable of providing a plurality of managed services of the cloud computing environment (e.g., data processing environment 100). In an example embodiment, a customer utilizes user portal 102 to request to deploy a managed service that is hosted by managed service provider 120 on an endpoint, such as endpoints 106 and 108. In various embodiments, managed services hosted by managed service provider 120 include patching, health checking, backup operations, restoration operations, monitoring, VM operations, account management, etc.

In example embodiments, managed service provider 120 can be a desktop computer, a computer server, or any other computer systems known in the art. In certain embodiments, managed service provider 120 represents computer systems utilizing clustered computers and components (e.g., database server computers, application server computers, etc.) that act as a single pool of seamless resources when accessed by elements of data processing environment 100 (e.g., compliance validation engine 110). In general, managed service provider 120 is representative of any electronic device or combination of electronic devices capable of executing computer readable program instructions. Managed service provider 120 may include components as depicted and described in further detail with respect to FIG. 6, in accordance with embodiments of the present invention. In another embodiment, managed service provider 120 also hosts checklist result repository 125.

Checklist result repository 125 is a database or repository that stores the results of checklists that are utilized for validation. For example, once a checklist is completed, checklist result consolidator 114 consolidates the results and stores the results in checklist result repository 125. Checklist result repository 125 can be implemented with any type of storage device, for example, persistent storage, which is capable of storing data that may be accessed and utilized by compliance validation engine 110, such as a database server, a hard disk drive, or a flash memory. In other embodiments, checklist result repository 125 can represent multiple storage devices.

Figure 2:
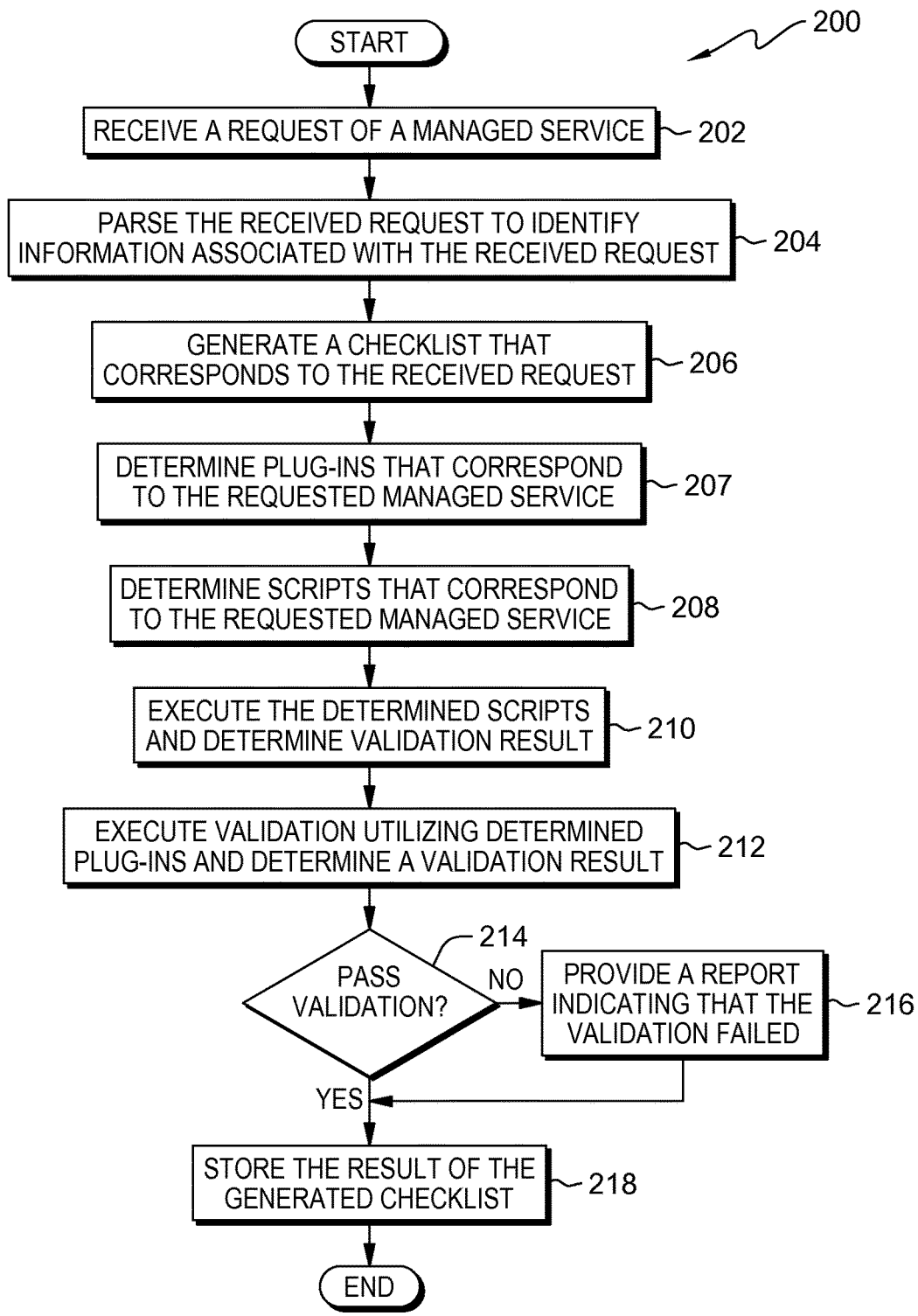
FIG. 2 is a flowchart depicting operational steps of a program for validating the configuration and compliance of managed services, in accordance with an embodiment of the present invention.

FIG. 2 is a flowchart depicting operational steps of compliance program 200, a program for validating the configuration and compliance of managed services, in accordance with embodiments of the present invention. In an example embodiment, compliance program 200 operates to validate the configuration and compliance of managed services that are deployed on a cloud computing environment.

In step 202, compliance program 200 receives a request of a managed service. In one embodiment, compliance program 200 receives a request of a managed service, which a customer (e.g., of data processing environment 100) input into user portal 102. In example embodiments, a customer inputs a request of a managed service into user portal 102. The request includes an indication of an endpoint on which to deploy the requested managed service (e.g., endpoints 106 and 108). Provisioning component 104 received the request from user portal 102 and routes the request to compliance program 200 on compliance validation engine 110. In an additional embodiment, provisioning component 104 also deploys the requested managed service onto the corresponding endpoint. In another embodiment, the received request can be a request for multiple managed services. REST API 111 can receive a service request and validate information included in the request. In an example, compliance program 200 receives a request for a managed service, and compliance program 200 utilizes REST API 111 to validate the format of the received request.

In one embodiment, the request of a managed service includes a type of service, a name of service, and a type of action. For example, a request includes a service type of "Backup Service," a service name of "Backup Storage Manager," and an action type of "Activate Service." In another embodiment, the request of a managed service can include a location of the managed service or the managed service provider (e.g., a uniform resource locator (URL)), a username and password that corresponds to the customer, and additional parameters associated with the request of a service.

FIG. 5 depicts sample service request 500, which is an example of a request of a managed service input by a customer into user portal 102. Sample service request 500 includes fields that provide information including: a service type, a service name, an action type, a URL associated with a managed service, a username, a password, and additional parameters associated with the request of a service. In an example, a customer inputs sample service request 500 into user portal 102, and the request is routed, via provisioning component 104, to compliance program 200 on compliance validation engine 110.

In step 204, compliance program 200 parses the received request to identify information associated with the received request. For example, compliance program 200 identifies relevant information that includes information to utilize when generating a checklist of configuration checks and security checks for the requested managed service. In an example embodiment, a customer inputs sample service request 500 into user portal 102 (step 202), and compliance program 200 identifies information associated with sample service request 500. Compliance program 200 can identify information in sample service request 500 that includes a service type, a service name, an action type, a location associated with a managed service, and additional parameters associated with the request of a service. In various embodiments, compliance program 200 is capable of parsing and analyzing the format of the received request to identify the payload of the request and associated information that is included in the request.

Compliance program 200 parses service requests to identify relevant information. In an example embodiment, compliance validation engine 110 receives (e.g., from provisioning component 104 or user portal 102) a request for a managed service that was input into user portal 102 (e.g., by a customer). In this example, compliance program 200 parses the received request to identify information that is associated with the received request (e.g., to utilize in creation of a checklist).

In step 206, compliance program 200 generates a checklist that corresponds to the received request. In one embodiment, compliance program 200 utilizes checklist generator 113 to generate a checklist for the managed service request based on the identified information (from step 204). Checklist set repository 119 is a repository or database on compliance validation engine 110 that stores checklist questions and corresponding answers/definitions, which are utilized by checklist generator 113. Compliance program 200 utilizes the information identified in step 204 and generates one or more checklists based on corresponding checklist question sets stored in checklist set repository 119.

Mapping database 117 maintains data that indicates relationships between managed services, plug-ins, checklist questions, and scripts. Compliance program 200 utilizes mapping database 117 to identify checklist questions (stored in checklist set repository 119) that correspond to the received request of a managed service and the corresponding endpoint. For example, compliance program 200 (e.g., utilizing checklist generator 113) utilizes information in mapping database 117 that describes relationships between managed service names and/or types (identified in step 204) to corresponding checklist questions and/or sets of checklist questions (stored in checklist set repository 119).

In an additional embodiment, compliance program 200 utilizes checklist generator 113 to identify managed service plug-ins that are associated with managed service names and/or types and corresponding checklist questions. In various embodiments, compliance program 200 utilizes the plug-ins to parse and validate the configuration on a managed service on an endpoint. For example, compliance program 200 (e.g., utilizing checklist generator 113) utilizes information in mapping database 117 that describes relationships between managed service names and/or types (identified in step 204) to corresponding managed services plug-ins (provided by managed services plug-in framework 112). In various embodiments, managed services plug-in framework 112 accesses and utilizes the plug-ins of managed services, which include information on how to perform validations for the configuration of managed services on endpoints (e.g., validations associated with and included in a checklist).

Compliance program 200 generates a checklist that corresponds to the managed service request that includes the corresponding checklist questions and sets of checklist questions (from checklist set repository 119). In example embodiments, compliance program 200 utilizes checklist generator 113, which generated a checklist of configuration and security checks by mapping user defined configuration and security specifications to corresponding service configuration parameters and service security parameters.

In one example, compliance program 200 receives a request (in step 202) for a "Backup and Recovery" process. Compliance program 200 utilizes checklist generator 113 and mapping database 117 to identify one or more relevant checklist questions in checklist set repository 119. For example, compliance program 200 identifies a checklist question of "Has the service been scheduled for backups according to the parameters of the account's backup policy?" In an additional embodiment, the checklist questions include an indication of types of evidence that indicates whether or not validation is passed. For example, compliance program 200 identifies evidence of "Output from the backup tool showing the schedule for the applicable systems." In addition, the checklist can include information indicating a requested endpoint (e.g., a VM, an operating system, a network application, a subsystem, etc.), action type (e.g., new, delete, rebuild, clone, etc.), and other types of information included in the received request.

In various aspects of the invention, generating a checklist that corresponds to the received request provides advantages of a checklist that is customized based on user selection of certain managed services. Further, the checklist is generated based on information that is parsed from the request that the user provides, which provides the advantage of basing the checklist off of the initially provided information. Generating checklists with the flexibility to support customized on-demand validation in a multi-tenant cloud environment is advantageous and allows different services with different configuration and security parameters to be validated with increased accuracy.

In step 207, compliance program 200 determines plug-ins that correspond to the requested managed service. In one embodiment, compliance program 200 utilizes data relationships in mapping database 117 that indicate plug-ins that correspond to managed services. For example, compliance program 200 utilizes data relationships in mapping database 117 to determine plug-ins that correspond to the requested managed service (e.g., plug-ins utilized by managed services plug-in framework 112). In an additional embodiment, compliance program 200 utilizes mapping database 117 to determine the plug-ins(s) that relate to the requested managed service and questions in the generated checklist. In an example embodiment, compliance program 200 utilizes mapping database 117 to identify plug-ins that correspond to the requested managed service and that compliance program 200 can utilize to perform validation based on the generated checklist (e.g., the plug-ins are identified during the generation of the checklist(s)). In various embodiments, the plug-ins of managed services include information on how to perform validations for the configuration of managed services on endpoints.

In step 208, compliance program 200 determines scripts that correspond to the requested managed service. In one embodiment, compliance program 200 utilizes script assembler 115 to determine scripts in script repository 118 that correspond to the requested managed service. In one aspect, compliance program 200 determines which scripts in script repository 118 relate to questions in the generated checklist for the received request (generated in step 206). Compliance program 200 determines one or more scripts from script repository 118 that compliance program 200 can utilize to validate the question(s) included in the generated checklist. In another aspect, compliance program 200 can utilize one or more identified scripts (from script repository 118) to determine a script that is customized to perform validation for one or more of the questions in a checklist. The process of determining one or more scripts that correspond to the requested managed service is described in further detail in FIG. 3.

In an additional embodiment, compliance program 200 utilizes mapping database 117 to determine the script(s) that relate to the requested managed service and questions in the generated checklist. In one example, compliance program 200 (e.g., utilizing script assembler 115) utilizes information in mapping database 117 that describes relationships between managed service names and/or types (identified in step 204) to relevant scripts (stored in script repository 118). In another example, compliance program 200 (e.g., utilizing script assembler 115) utilizes information in mapping database 117 that describes relationships between managed service plug-ins (e.g., associated with the generated checklist and from managed services plug-in framework 112) to relevant scripts (stored in script repository 118).

In step 210, compliance program 200 executes the determined scripts and determines a validation result. In one embodiment, compliance program 200 utilizes script executor 116 to execute the determined scripts (from step 208) and determine a validation result. Compliance program 200 executes the scripts on the requested endpoint (e.g., endpoints 106 and/or 108). Compliance program 200 can identify the requested endpoint in step 204 based on parsing the received request to identify one or more endpoints included in the request. In an example, compliance program 200 transfers the determined scripts to the endpoint (e.g., utilizing secure shell (SSH), secure copy (SCP), or another approach to transfer scripts) and executes the scripts on the endpoint. Once executed on an endpoint, the scripts provide an indication (i.e., a validation result) of whether the managed service on the endpoint passes the configuration and security checks (e.g., validation checks based on the generated checklist). Based on the results returned from execution of the determined scripts on the endpoint(s), compliance program 200 determined a validation result for managed service deployed to the endpoint.

In step 212, compliance program 200 executes validation utilizing determined plug-ins and determines a validation result. In one embodiment, compliance program 200 utilizes plug-ins that are managed by managed services plug-in framework 112 and that correspond to the requested managed service. In another aspect, compliance program 200 utilizes data relationships in mapping database 117 that indicate plug-ins that correspond to managed services. In various embodiments, the plug-ins of managed services include information on how to perform validations for the configuration of managed services on endpoints. Compliance program 200 utilizes the plug-ins to determine a validation result (e.g., whether the managed service on the endpoint passes the configuration and security checks). The process of determining a validation result utilizing plug-ins for the managed service is described in additional detail in FIG. 4.

In decision step 214, compliance program 200 determines whether the validation passes. In one embodiment, compliance program 200 utilizes the validation result determined from executing the determined scripts (from step 210) and the validation result determined from executing the plug-ins (from step 212) to determine whether the validation passes. If compliance program 200 determines that the validation passes, then the requested managed service is validated to have been deployed on the requested endpoint, configured properly on the endpoint, and included the proper security features.

In an example embodiment, if both the validation results from step 210 and from step 212 indicate a complete pass, then compliance program 200 determines that the validation for deploying the managed service does pass. In another example embodiment, in response to determining that the validation results from step 210 and from step 212 indicate that a certain percentage of validation checks have passed (e.g., a threshold percentage for validation), compliance program 200 determines that the validation for deploying the managed service does pass.

In step 216, compliance program 200 provides a report indicating that the validation failed. More specifically, in response to determining that the validation did not pass (decision step 214, no branch), compliance program 200 provides a report indicating that the validation failed. In example embodiments, compliance program 200 provides a report to user portal 102 and/or an account associated with the user that requested the managed service (e.g., an account provided in the request). The provided report can include an indication of why the validation failed (e.g., which scripts and/or plugins failed), information included in the request, and other information that is relevant to the request for the managed service. In another embodiment, compliance program 200 provides a report that includes the generated checklist, which can include an indication of which questions passed/failed.

In step 218, compliance program 200 stores the result of the generated checklist. In one scenario, in response to determining that the validation does pass (decision step 214, yes branch), compliance program 200 stores the result of the generated checklist in checklist result repository 125. In another scenario, compliance program 200 determines that the validation does not pass (decision step 214, no branch), provides a failure report, and stores the result (i.e., failing result) of the generated checklist in checklist result repository 125. In one embodiment, compliance program 200 utilizes checklist result consolidator 114 to consolidate the results of the one or more checklist questions (or one or more checklists) utilized in the validation into a report, which compliance program 200 can then send to checklist result repository 125.

Figure 3:
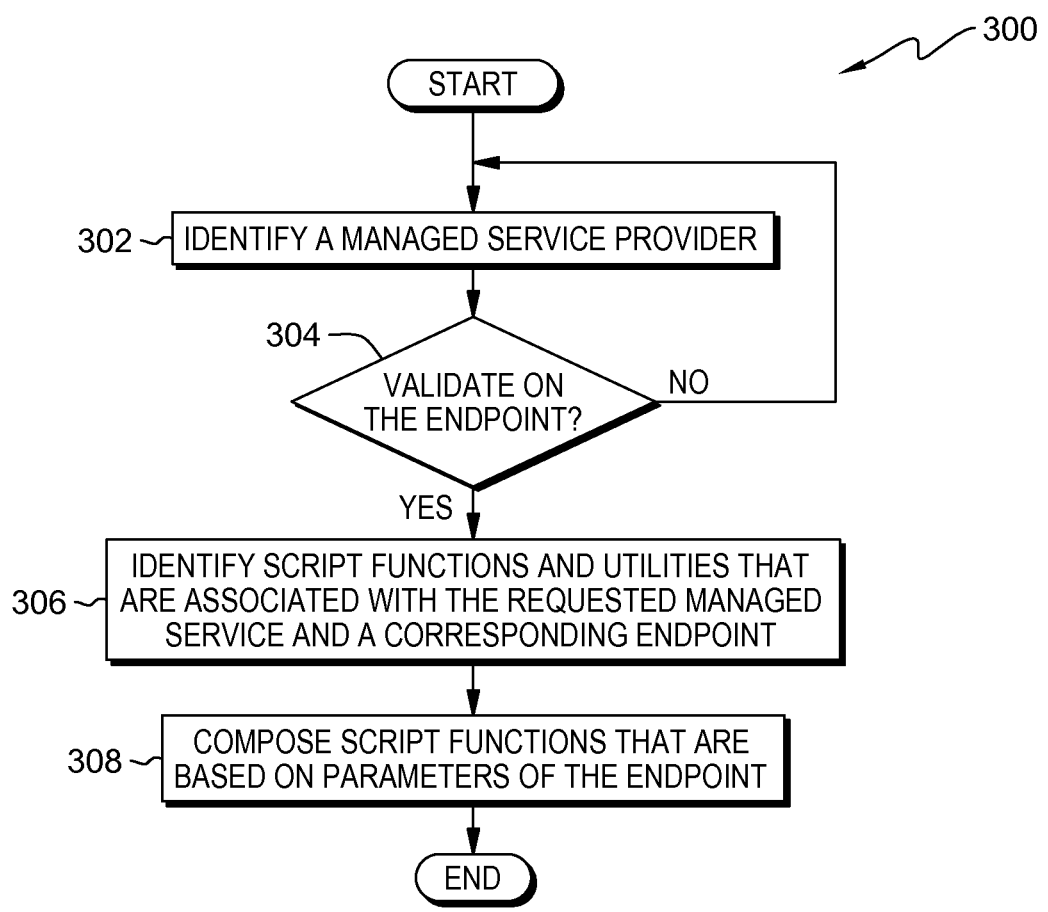
FIG. 3 is a flowchart depicting operational steps of a program for determining scripts to utilize for validation, in accordance with an embodiment of the present invention.

FIG. 3 is a flowchart depicting script program 300, a program for determining scripts to utilize for validation, in accordance with embodiments of the present invention. Script program 300 is a function of compliance program 200 (depicted in FIG. 2). In an example embodiment, script program 300 further describes a process for determining scripts that correspond to the requested managed service (i.e., step 208 of compliance program 200). In one embodiment, script program 300 operates for each managed service provider that is indicated in the received request.

In step 302, script program 300 identifies a managed service provider. In one embodiment, script program 300 identifies a managed service provider indicated in the request for a managed service. In another embodiment, script program 300 identifies a managed service provider that corresponds to a managed service that is requested in the received request. In various embodiments, since script program 300 operates for each managed service provider that is indicated in the received request, script program 300 identifies each managed service provider that is associated with the received request (based on the multiple possible iterations of script program 300).

In decision step 304, script program 300 determines whether the endpoint requests validation for the identified managed service provider. In one embodiment, script program 300 determines whether the endpoint indicated in the request for the managed service requests to perform validation for the identified managed service provider (identified in step 302). In example embodiments, script program 300 can utilize stored preferences that correspond to the endpoint and/or information provided in the request for the managed service to determine whether validation is to occur. In response to determining that the endpoint does not request for validation to occur (decision step 304, no branch), script program 300 returns to step 302 and identifies another managed service provider associated with the received request (if another is present). In an example, if script program 300 determines that validation is not to occur, then script program 300 does not need to perform validation for the corresponding managed service (e.g., the scripts corresponding to the managed service do not need to execute).

In step 306, script program 300 identifies script functions and utilities that are associated with the requested managed service and a corresponding endpoint. More specifically, in response to determining that the endpoint does request for validation to occur (decision step 304, yes branch), script program 300 identifies script functions and utilities that are associated with the requested managed service and a corresponding endpoint. In one embodiment, script program 300 utilizes script assembler 115 to identify scripts in script repository 118 that correspond to the requested managed service and the corresponding endpoint indicated in the request for the managed service. In an additional embodiment, script program 300 utilizes mapping database 117 to identify the script(s) that relate to the requested managed service, the corresponding endpoint indicated in the request for the managed service, and questions in the generated checklist. In an example, script repository 118 includes common scripts that are relevant to certain types of managed services, certain managed service providers, certain endpoints, etc. Script program 300 utilizes information in the received request for a managed service to identify the common script functions and/or utilities that are associated with the requested managed service and a corresponding endpoint indicated in the request for the managed service.

In step 308, script program 300 composes script functions that are based on parameters of the endpoint. In one embodiment, script program 300 utilizes the identified script functions that correspond to the managed service (e.g., identified in step 306 or a subset of the scripts identified in step 306). In another embodiment, script program 300 creates one or more script functions for the requested managed service based on parameters of the endpoint indicted in the request (e.g., based on and utilizing one or more script function from script repository 118. In an additional embodiment, script program 300 can store composed script functions in script repository 118 for potential future use.

Figure 4:
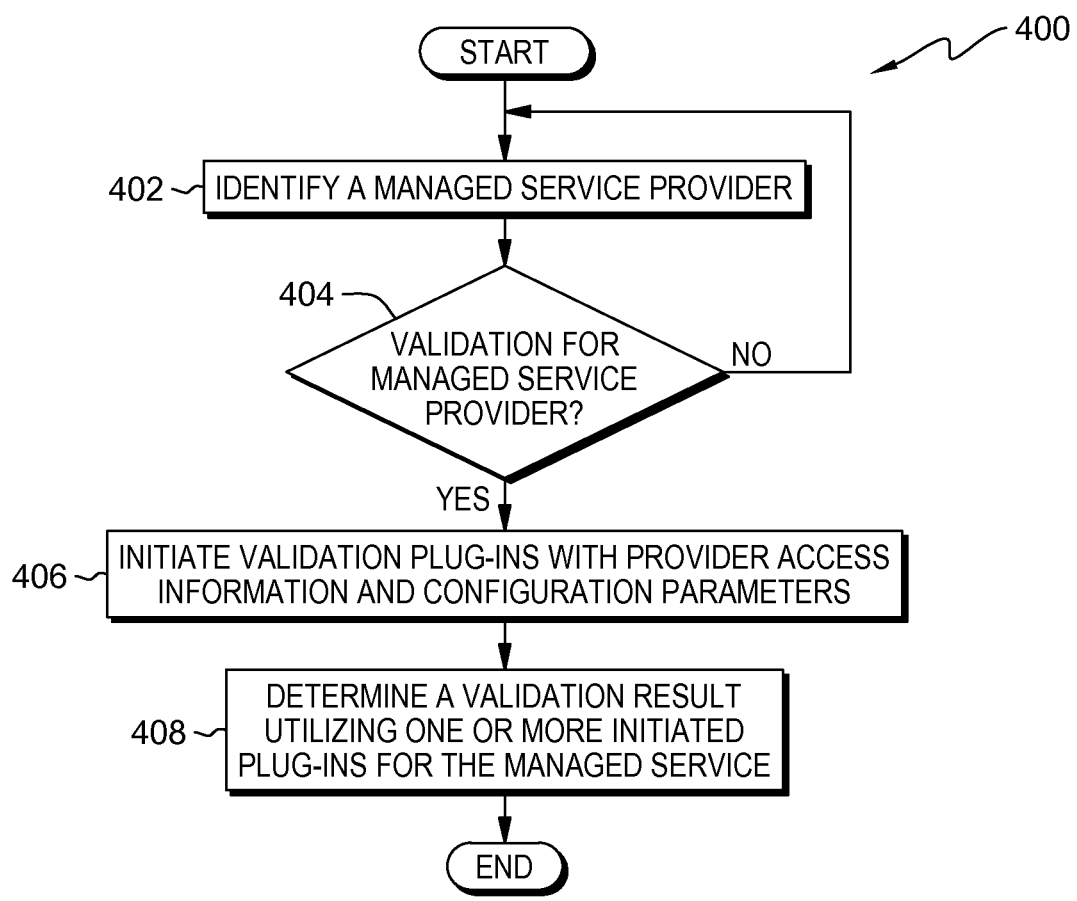
FIG. 4 is a flowchart depicting operational steps of a program for performing validation utilizing plug-ins, in accordance with an embodiment of the present invention.

FIG. 4 is a flowchart depicting plug-in program 400, a program for performing validation utilizing plug-ins, in accordance with embodiments of the present invention. Plug-in program 400 is a function of compliance program 200 (depicted in FIG. 2). In an example embodiment, plug-in program 400 further describes a process for determining a validation result utilizing plug-ins for the managed service (i.e., step 212 of compliance program 200). In one embodiment, plug-in program 400 operates for each managed service provider that is indicated in the received request.

In step 402, plug-in program 400 identifies a managed service provider. In one embodiment, plug-in program 400 identifies a managed service provider indicated in the request for a managed service. In another embodiment, plug-in program 400 identifies a managed service provider that corresponds to a managed service that is requested in the received request. In various embodiments, since plug-in program 400 operates for each managed service provider that is indicated in the received request, plug-in program 400 identifies each managed service provider that is associated with the received request (based on the multiple possible iterations of plug-in program 400).

In decision step 404, plug-in program 400 determines whether to perform validation for the identified managed service provider. In one embodiment, plug-in program 400 determines whether to perform validation for the identified managed service provider based on parameters of the endpoint indicated in the request for the managed service and/or the identified managed service provider (from step 402). In an example embodiment, plug-in program 400 can utilize stored preferences that correspond to the endpoint and/or information provided in the request for the managed service to determine whether validation is to occur. In another example embodiment, plug-in program 400 can utilize stored preferences associated with the identified managed service provider and/or data associations in mapping database 117 to determine whether validation is to occur. For example, plug-in program 400 determines whether managed services plug-in framework 112 is managing one or more plug-ins that correspond to the requested managed service (e.g., based on the identified managed service provider) in the received request.

In response to determining not to perform validation for the identified managed service (decision step 404, no branch), plug-in program 400 returns to step 402 and identifies another managed service provider associated with the received request (if another is present). In an example, if plug-in program 400 determines that validation is not to occur, then plug-in program 400 does not need to perform validation for the corresponding managed service (e.g., utilizing plug-ins associated with the requested managed service or identified managed service provider).

In step 406, plug-in program 400 initiates validation plug-ins with provider access information and configuration parameters. More specifically, in response to determining to perform validation for the identified managed service provider (decision step 404, yes branch), plug-in program 400 initiates validation plug-ins (e.g., on the endpoint indicated in the request for the managed service) with provider access information and configuration parameters. In one embodiment, plug-in program 400 initiates one or more validation plug-ins (e.g., from managed services plug-in framework 112) with corresponding managed service provider access information and configuration parameters. In an example, the configuration parameters correspond to the requested parameters for properly deploying a managed service on an endpoint, which can be included in the request for the managed service and/or associated with the endpoint or managed service provider. In one aspect of the invention, plug-in program 400 utilizes plug-ins that are managed by managed services plug-in framework 112 and that correspond to the requested managed service. In another aspect, plug-in program 400 utilizes data relationships in mapping database 117 that indicate plug-ins that correspond to managed services.

In step 408, plug-in program 400 determines a validation result utilizing one or more of the initiated plug-ins for the managed service. In one embodiment, plug-in program 400 utilizes the initiated plug-ins (from step 406) to determine a validation result. In various embodiments, the plug-ins of managed services (e.g., from managed services plug-in framework 112) include information on how to perform validations for the configuration of managed services on endpoints. Plug-in program 400 utilizes the plug-ins to determine a validation result (e.g., whether the managed service on the endpoint passes the configuration and security checks). For example, plug-in program 400 can execute the plug-ins on the endpoint, and the plug-ns provide a validation result that indicates whether the managed service on the endpoint passes configuration and security checks.

Various aspects of the invention provide advantages of performing validation checks for configuration and compliance of services based on user selection of certain managed services. Further, the validation is performed utilizing checklists, scripts, and/or plug-ins based on information that is parsed from the request that the user provides, which provides the advantage of a customized validation based on the initially provided information. A customized validation approach provides flexibility to support customized on-demand validation in a multi-tenant cloud environment and provides advantages of allowing different services with different configuration and security parameters to be validated with increased accuracy.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
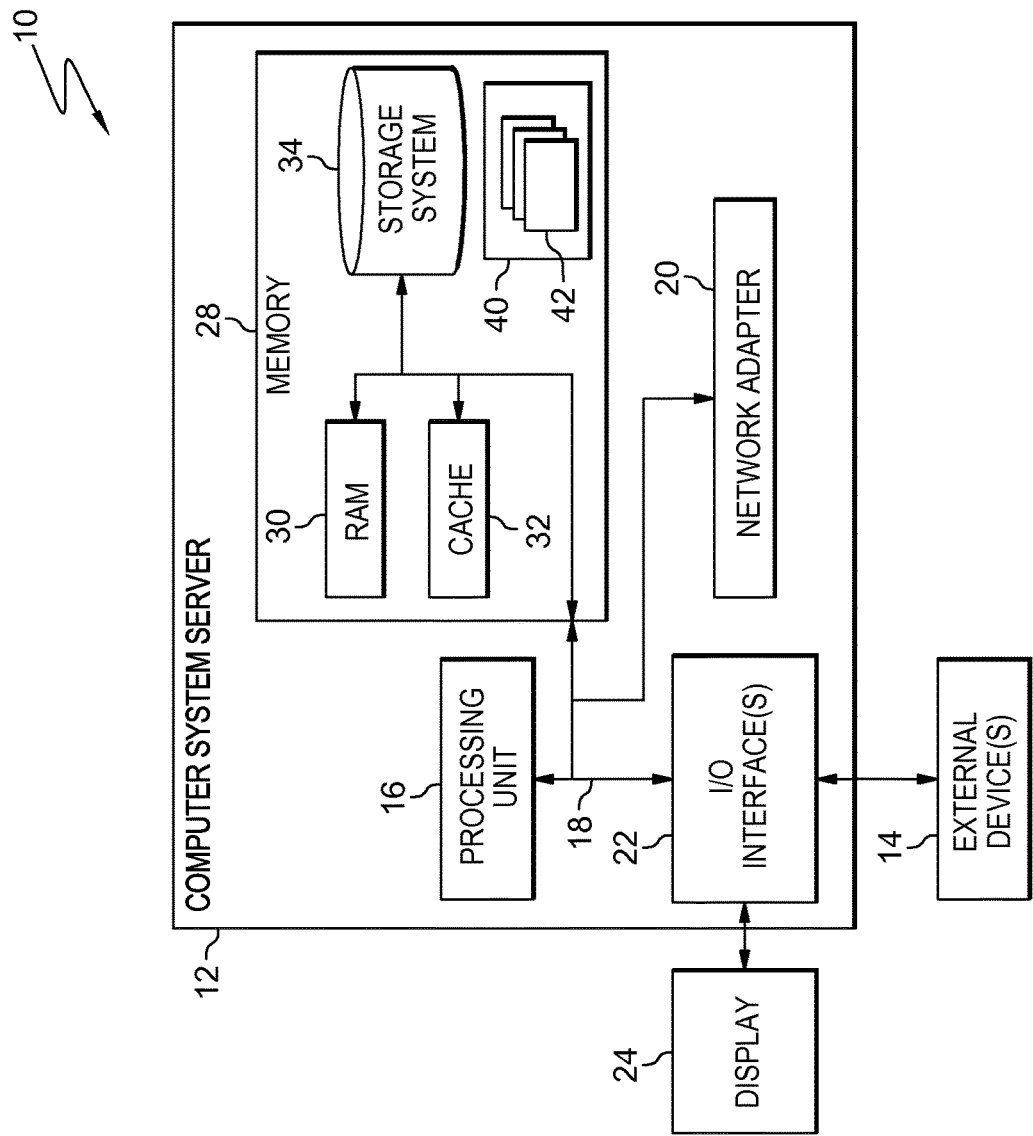
FIG. 6 depicts a cloud computing node, according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein.

Regardless, cloud computing node 10 is capable of being implemented and/or performing any of the functionality set forth hereinabove. In example embodiments, cloud computing node 10 is representative of endpoints 106 and 108, compliance validation engine 110, and managed service provider 120.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing unit 16, a memory 28, and a bus 18 that couples various system components including memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external device(s) 14, such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interface(s) 22. Still yet, computer system/server 12 can communicate with one or more networks, such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
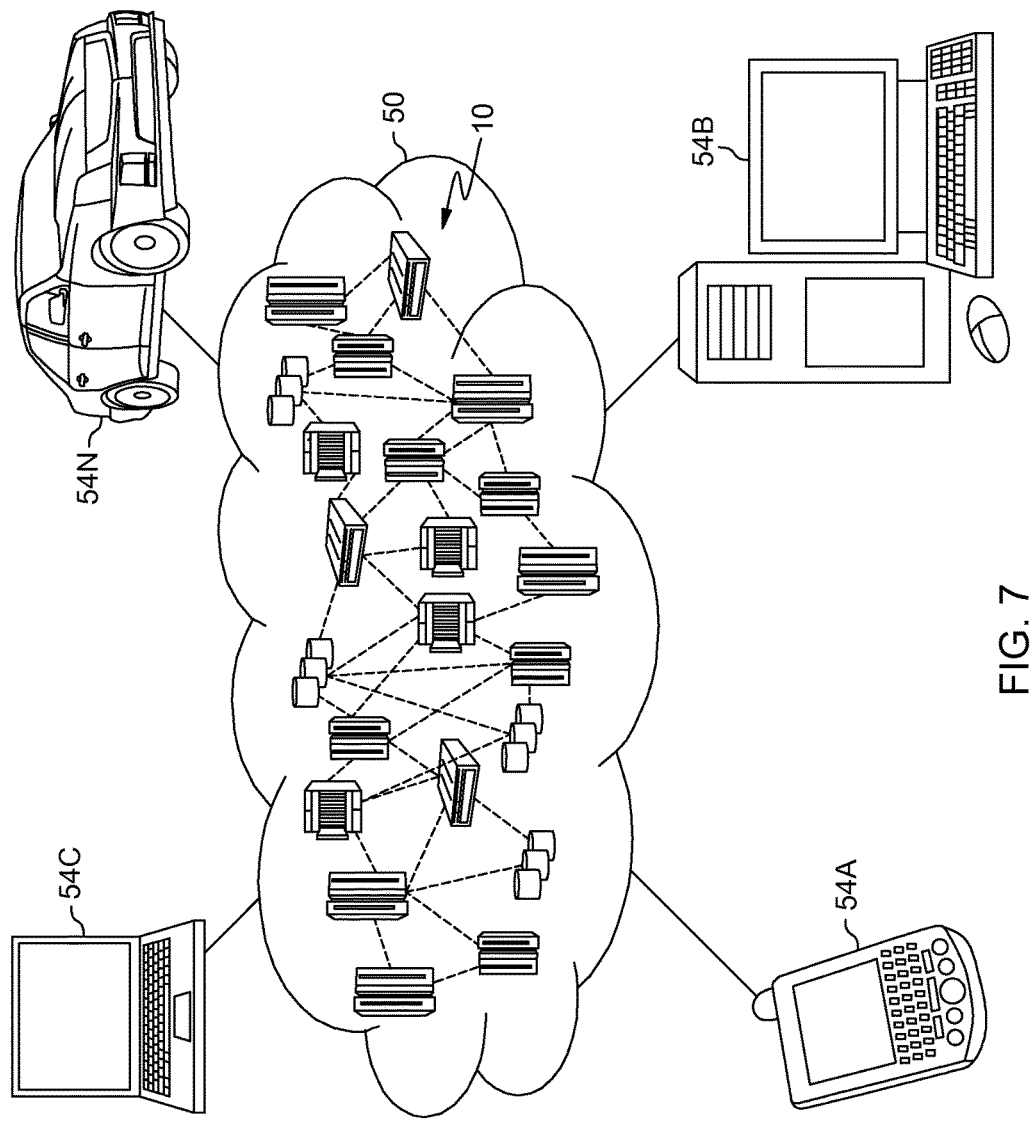
FIG. 7 depicts a cloud computing environment, according to an embodiment of the present invention.

Referring now to FIG. 7, illustrative cloud computing environment 50 is depicted. As shown, cloud computing environment 50 comprises one or more cloud computing node 10 with which local computing devices used by cloud consumers, such as, for example, personal digital assistant (PDA) or cellular telephone 54A, desktop computer 54B, laptop computer 54C, and/or automobile computer system 54N may communicate. Cloud computing node 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 7 are intended to be illustrative only and that cloud computing node 10 and cloud computing environment 50 can communicate with any type of computerized device over any type of network and/or network addressable connection (e.g., using a web browser).

Figure 8:
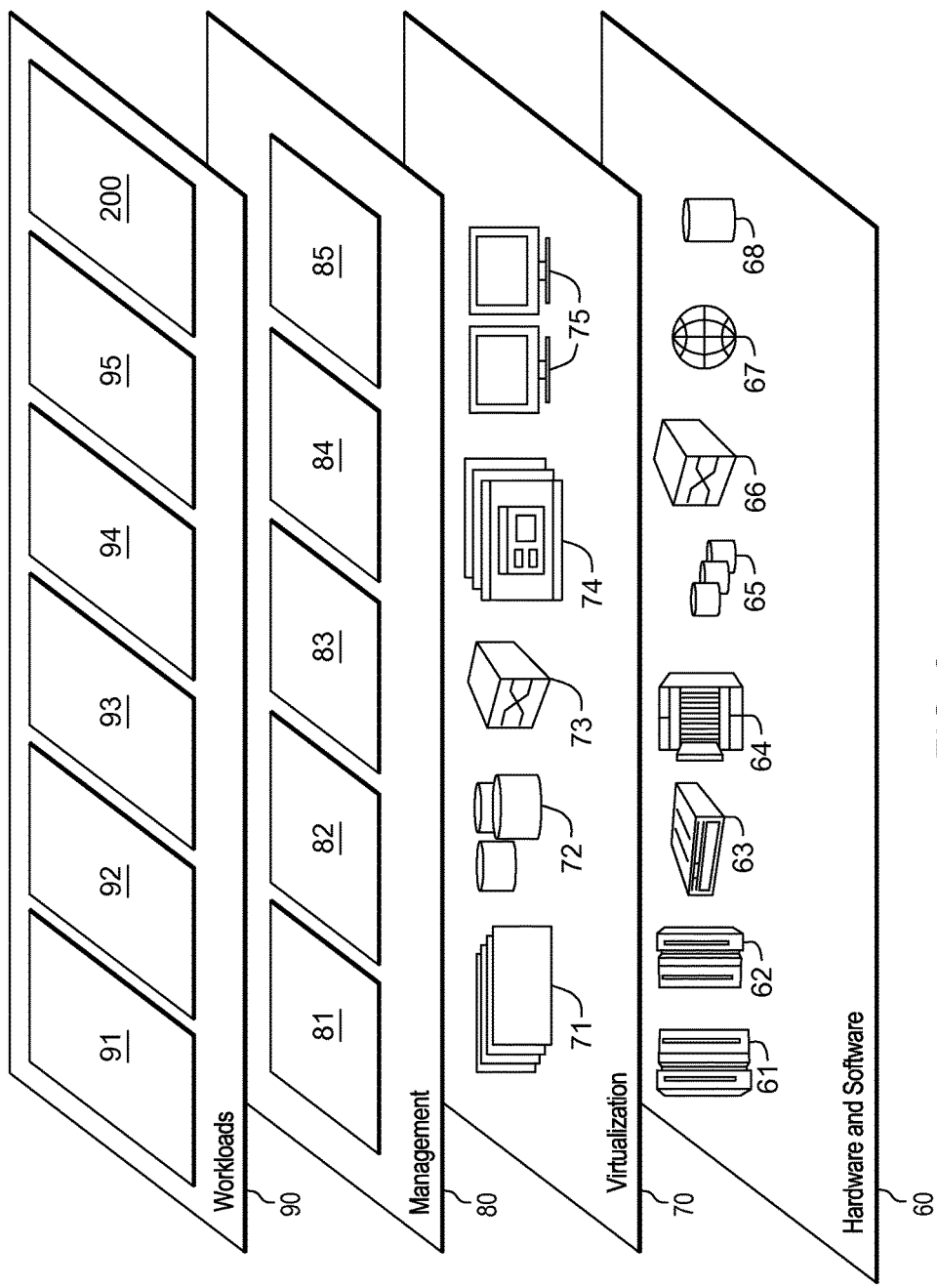
FIG. 8 depicts abstraction model layers, according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compliance program 200.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for validation of services, the method comprising:
   receiving, by one or more processors, a request of a service for deployment on an endpoint;
   parsing, by one or more processors, the received request of the service to identify information included in the received request of the service;
   generating, by one or more processors, a checklist that corresponds to the received request of the service based on the identified information, wherein the generated checklist includes configuration and security checks that correspond to determining whether the endpoint meets one or more validation parameters associated with deploying the requested service on the endpoint;
   generating, by one or more processors, a set of validation scripts corresponding to executing the generated checklist and the configuration and security checks that are associated with the received request by assembling, from a script repository, a plurality of validation scripts that correspond to the requested service and composing validation scripts that are customized to-parameters of the endpoint and validate the parameters of the endpoint, wherein the generated set of validation scripts determine whether the endpoint meets one or more validation parameters associated with deploying the requested service on the endpoint by executing on the endpoint to determine characteristics of the endpoint in relation to the one or more validation parameters; and
   determining, by one or more processors, a validation result utilizing the generated checklist, the generated set of validation scripts, and corresponding evidence indicating whether the endpoint meets one or more validation parameters, wherein the validation result indicates whether to initiate deployment of the requested service on the endpoint according to the configuration and security checks in the generated checklist and the set of validation scripts, wherein determining the validation result utilizing the generated checklist and the generated set of validation scripts further comprises:
   identifying, by one or more processors, one or more validation plug-ins that are associated with the requested service;
   executing, by one or more processors, the one or more identified validation plug-ins; and
   determining, by one or more processors, a validation result based on results returned from the executed validation plug-ins.

2. The method of claim 1, wherein determining the validation result utilizing the generated checklist and the generated set of validation scripts further comprises:
   executing, by one or more processors, prior to deployment and installation of the requested service on the endpoint, the set of validation scripts on the endpoint; and
   determining, by one or more processors, a validation result based on results returned from the executed set of validation scripts.

3. The method of claim 1, wherein generating a checklist that corresponds to the received request of the service based on the identified information further comprises:
   identifying, by one or more processors, one or more checklist questions stored in a database that are associated with the identified information included in the received request of the service; and
   generating, by one or more processors, a checklist that includes the one or more identified checklist questions.

4. The method of claim 1, wherein receiving the request of the service further comprises:
   receiving, by one or more processors, a selection of one or more services via one or more user interface portals, wherein each service is respectively associated with configuration parameters and security parameters.

5. The method of claim 1, further comprising:
   storing, by one or more processors, results of the configuration and security checks included in the generated checklist.

6. The method of claim 1, wherein determining the validation result utilizing the generated checklist and the generated set of validation scripts further comprises:
   creating, by one or more processors, one or more script functions based on parameters of the corresponding endpoint and the one or more identified script functions;
   executing, by one or more processors, the one or more created script functions; and determining, by one or more processors, a validation result based on results returned from the executed script functions.

7. The method of claim 1, wherein generating the set of validation scripts corresponding to executing the generated checklist and the configuration and security checks that are associated with the received request further comprises:
identifying, by one or more processors, a data association that maps a first validation script, that is stored in the script repository, to the requested service.

8. A computer program product for validation of services, the computer program product comprising:
one or more computer readable storage media and program instructions stored on the one or more computer readable storage media, the program instructions comprising:
program instructions to receive a request of a service for deployment on an endpoint;
program instructions to parse the received request of the service to identify information included in the received request of the service;
program instructions to generate a checklist that corresponds to the received request of the service based on the identified information, wherein the generated checklist includes configuration and security checks that correspond to determining whether the endpoint meets one or more validation parameters associated with deploying the requested service on the endpoint;
program instructions to generate a set of validation scripts corresponding to executing the generated checklist and the configuration and security checks that are associated with the received request by assembling, from a script repository, a plurality of validation scripts that correspond to the requested service composing validation scripts that are customized to parameters of the endpoint and validate the parameters of the endpoint, wherein the generated set of validation scripts determine whether the endpoint meets one or more validation parameters associated with deploying the requested service on the endpoint by executing on the endpoint to determine characteristics of the endpoint in relation to the one or more validation parameters; and
program instructions to determine a validation result utilizing the generated checklist, the generated set of validation scripts, and corresponding evidence indicating whether the endpoint meets one or more validation parameters, wherein the validation result indicates whether to initiate deployment of the requested service on the endpoint according to the configuration and security checks in the generated checklist and the set of validation scripts, wherein the program instructions to determine the validation result utilizing the generated checklist and the generated set of validation scripts further comprise program instructions to:
identify one or more validation plug-ins that are associated with the requested service;
execute the one or more identified validation plug-ins; and
determine a validation result based on results returned from the executed validation plug-ins.

9. The computer program product of claim 8, wherein the program instructions to determine the validation result utilizing the generated checklist and the generated set of validation scripts further comprise program instructions to:
execute, prior to deployment and installation of the requested service on the endpoint, the set of validation scripts on the endpoint the one or more identified script functions on the corresponding endpoint; and
determine a validation result based on results returned from the executed set of validation scripts.

10. The computer program product of claim 8, wherein the program instructions to generate a checklist that corresponds to the received request of the service based on the identified information further comprise program instructions to:
identify one or more checklist questions stored in a database that are associated with the identified information included in the received request of the service; and
generate a checklist that includes the one or more identified checklist questions.

11. The computer program product of claim 8, further comprising program instructions, stored on the one or more computer readable storage media, to:
store results of the configuration and security checks included in the generated checklist.

12. The computer program product of claim 8, wherein the program instructions to determine the validation result utilizing the generated checklist and the generated set of validation scripts further comprise program instructions to:
create one or more script functions based on parameters of the corresponding endpoint and the one or more identified script functions;
execute the one or more created script functions; and
determine a validation result based on results returned from the executed script functions.

13. A computer system for validation of services, the computer system comprising:
one or more computer processors;
one or more computer readable storage media; and
program instructions stored on the computer readable storage media for execution by at least one of the one or more processors, the program instructions comprising:
program instructions to receive a request of a service for deployment on an endpoint;
program instructions to parse the received request of the service to identify information included in the received request of the service;
program instructions to generate a checklist that corresponds to the received request of the service based on the identified information, wherein the generated checklist includes configuration and security checks that correspond to determining whether the endpoint meets one or more validation parameters associated with deploying the requested service on the endpoint;
program instructions to generate a set of validation scripts corresponding to executing the generated checklist and the configuration and security checks that are associated with the received request by assembling, from a script repository, a plurality of validation scripts that correspond to the requested service and composing validation scripts that are customized to parameters of the endpoint and validate the parameters of the endpoint, wherein the generated set of validation scripts determine whether the endpoint meets one or more validation parameters associated with deploying the requested service on the endpoint by executing on the endpoint to determine characteristics of the endpoint in relation to the one or more validation parameters; and
program instructions to determine a validation result utilizing the generated checklist, the generated set of validation scripts, and corresponding evidence indicating whether the endpoint meets one or more validation parameters, wherein the validation result indicates whether to initiate deployment of the requested service on the endpoint according to the configuration and security checks in the generated checklist and the set of validation scripts, wherein the program instructions to determine the validation result utilizing the generated checklist and the generated set of validation scripts further comprise program instructions to:
  identify one or more validation plug-ins that are associated with the requested service;
  execute the one or more identified validation plug-ins; and
  determine a validation result based on results returned from the executed validation plug-ins.

14. The computer system of claim 13, wherein the program instructions to determine the validation result utilizing the generated checklist and the generated set of validation scripts further comprise program instructions to:
  execute, prior to deployment and installation of the requested service on the endpoint, the set of validation scripts on the endpoint the one or more identified script functions on the corresponding endpoint; and
  determine a validation result based on results returned from the executed set of validation scripts.

15. The computer system of claim 13, wherein the program instructions to generate a checklist that corresponds to the received request of the service based on the identified information further comprise program instructions to:
  identify one or more checklist questions stored in a database that are associated with the identified information included in the received request of the service; and
  generate a checklist that includes the one or more identified checklist questions.

16. The computer system of claim 13, wherein the program instructions to receive the request of the service further comprise program instructions to:
  receive a selection of one or more services via one or more user interface portals, wherein each service is respectively associated with configuration parameters and security parameters.

17. The computer system of claim 13, wherein the program instructions to determine the validation result utilizing the generated checklist and the generated set of validation scripts further comprise program instructions to:
  create one or more script functions based on parameters of the corresponding endpoint and the one or more identified script functions;
  execute the one or more created script functions; and
  determine a validation result based on results returned from the executed script functions.

* * * * *